(12) United States Patent
Powell et al.

(10) Patent No.: US 7,664,796 B2
(45) Date of Patent: Feb. 16, 2010

(54) ELECTRONIC LABELING FOR OFFLINE MANAGEMENT OF STORAGE DEVICES

(75) Inventors: Therron L. Powell, Redmond, WA (US); Carl M. Carter-Schwendler, Kirkland, WA (US); David P. Golds, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 450 days.

(21) Appl. No.: 10/965,562

(22) Filed: Oct. 13, 2004

(65) Prior Publication Data
US 2006/0080359 A1 Apr. 13, 2006

(51) Int. Cl.
*G06F 17/30* (2006.01)
(52) U.S. Cl. .......................... 707/204; 710/33; 711/100
(58) Field of Classification Search ................ 360/72.1, 360/69; 348/231.6; 705/26; 340/815; 455/66.1; 345/156; 707/200
See application file for complete search history.

(56) References Cited

U.S. PATENT DOCUMENTS

| | | | | |
|---|---|---|---|---|
| 5,263,142 | A * | 11/1993 | Watkins et al. ................ 710/22 |
| 5,379,439 | A * | 1/1995 | Harrison et al. ............ 360/72.1 |
| 5,522,089 | A | 5/1996 | Kikinis |
| 5,528,758 | A | 6/1996 | Yeh |
| 6,233,389 | B1 | 5/2001 | Barton |
| 6,574,678 | B1 | 6/2003 | Nykanen |
| 6,611,850 | B1 * | 8/2003 | Shen ........................ 707/204 |
| 6,671,757 | B1 | 12/2003 | Cash |
| 6,832,729 | B1 * | 12/2004 | Perry et al. ............ 235/472.01 |
| 6,862,604 | B1 * | 3/2005 | Spencer et al. .............. 707/205 |
| 6,917,349 | B2 * | 7/2005 | McGowan et al. ........... 345/30 |
| 6,970,318 | B2 * | 11/2005 | Goodman et al. ............ 360/69 |
| 7,024,427 | B2 * | 4/2006 | Bobbitt et al. .............. 707/200 |
| 7,069,369 | B2 * | 6/2006 | Chou et al. ................. 710/301 |
| 7,209,863 | B2 * | 4/2007 | Fukuda et al. .............. 702/186 |
| 7,346,472 | B1 * | 3/2008 | Moskowitz et al. .......... 707/10 |
| 7,475,363 | B1 * | 1/2009 | Yehuda et al. .............. 707/100 |
| 2001/0015760 | A1 * | 8/2001 | Fellegara et al. ........ 348/333.01 |
| 2002/0010641 | A1 * | 1/2002 | Stevens et al. ................ 705/26 |
| 2002/0063631 | A1 * | 5/2002 | Aguren et al. ........... 340/815.4 |

(Continued)

OTHER PUBLICATIONS

Office Action dated Aug. 22, 2007 cited in U.S. Appl. No. 10/964,854.

(Continued)

*Primary Examiner*—Tim T. Vo
*Assistant Examiner*—Jau-Shya Meng
(74) *Attorney, Agent, or Firm*—Workman Nydegger (57) ABSTRACT

A system and method using hardware and software components enable a storage module to maintain information about an associated storage device and its content such that the information is accessible when the storage device is offline or in a low power configuration. A general-computing host system connects to the storage module via a pluggable interface to provide information to a nonvolatile memory cache on the storage module. The storage module includes a separate power source, an output display, input buttons, and a module controller. The host system includes an application and host platform for processing file-system related events to send records to the module controller to automatically update a catalog representing storage device information in the nonvolatile memory. When offline, the user may display the catalog information and use the buttons to navigate among it. The host system may also allow the user to interactively review and modify the catalog.

39 Claims, 7 Drawing Sheets

U.S. PATENT DOCUMENTS

| | | |
|---|---|---|
| 2003/0093792 A1 | 5/2003 | Labeeb |
| 2004/0107260 A1 | 6/2004 | Hashiya |
| 2004/0224638 A1* | 11/2004 | Fadell et al. ............... 455/66.1 |
| 2005/0068547 A1* | 3/2005 | Negishi et al. ................ 358/11 |
| 2005/0108769 A1 | 5/2005 | Arnold |
| 2006/0007576 A1* | 1/2006 | Georgis ....................... 360/69 |
| 2006/0095647 A1* | 5/2006 | Battaglia et al. ............ 711/100 |

OTHER PUBLICATIONS

Office Action dated Apr. 17, 2008 cited in U.S. Appl. No. 10/964,854.
Office Action dated Oct. 1, 2008 cited in U.S. Appl. No. 10/964,854.

* cited by examiner

ELECTRONIC LABELING FOR OFFLINE MANAGEMENT OF STORAGE DEVICES

CROSS-REFERENCE TO RELATED APPLICATION

The present invention is related to U.S. patent application Ser. No. 10/964,854, entitled "Offline Caching of Control Transactions for Storage Devices," filed concurrently herewith, assigned to the assignee of the present invention and hereby incorporated by reference in its entirety.

FIELD OF THE INVENTION

The invention relates generally to computer storage devices, and more particularly to identifying content stored on computer storage devices.

BACKGROUND

A longstanding problem with digital storage devices is managing the stored content. Computer users have adopted various techniques to describe the volumes of information that may be held on digital storage media such as floppy disks, tapes and optical disks. While small amounts of content stored on low capacity devices like floppy disks may be adequately manually labeled. As the capacity of storage media grows, so does the amount of information hosted on such digital storage repositories. As a result, management of the storage device and its content becomes even more difficult for computer users.

For example, conventional labeling and inspection techniques do not scale well, in that as the capacities of storage media grow, so do the problems of providing human-readable descriptions and meaningful labeling. At times when the storage media is accessible on a running computer system, that is, while the storage media can be considered in an "online" state, directory and search technologies provide one viable solution. However, a significant need to manage descriptive information about stored content also exists when in an offline state.

For example, as hard drive costs decrease, users are acquiring new hard drives faster than they are failing or being retired. However limits on drive cabinetry, power, cabling and controllers means that some of the storage devices need to remain in disconnected states until specifically needed. The growth of portable external drives also increases the amount of storage in disconnected states. As a result, there is a need to track the content of such drives when disconnected.

The need to determine what content is stored on a disconnected storage device is becoming more important with the rapidly expanding technology of hot-pluggable storage devices for computing systems. This was not as significant of an issue in the past, where many prior consumer drives interfaced via ATA or IDE standards, which required that such drives be connected or removed from the computer system only while the whole system is powered down. Thus, most users did not frequently exchange hard drives in their systems, but rather used tape, CD-ROM and DVD-ROM for maintaining large quantities of swappable content. However, contemporary technologies such as USB, 1394 and SCSI, as well as Serial ATA (SATA), have resulted much more in portable hard drives, in which ordinary computer consumers may have multiple hard drives that are regularly connected, disconnected and transported between multiple systems. Mountable media scenarios have been valuable for extending available capacities via exchangeable storage media.

Indeed, many computer users are now using mechanical hard drives as mobile repositories/portable media used among different computer system devices. There are many scenarios in which it is faster an/or otherwise preferable to physically transport high-capacity media, instead of transmitting the data. By way of example, one emerging PC-based use for hard drives is a Personal Video Recorder (PVR). With such technology, hard drives likely can be used in a manner that is similar to how videotape cassettes have been in the past, e.g., by moving the hard drives from one computer/television to another as needed.

In sum, the number of useful and important storage devices owned by computer users will continue to expand, meaning some will likely exist in a disconnected state until needed. Managing these offline devices will be more difficult and cumbersome. The power and time required to connect a storage device's communications interfaces and spin up a drive make it difficult to perform inspection to determine the content of an offline storage module. Further, it may not be possible to plug in a drive when the system is engaged with other activities such as capture, download or playback. Physically affixing a printed label is one technique used to track the content of a storage device, but this not only requires overt human operation, which is undesirable, but also such static labels need to be replaced as stored content changes, and/or are not large enough to contain the amount of information needed to fully identify the content of high capacity storage devices.

Moreover, when dealing with disconnected storage devices, content tracking is only one common issue. Elaborate high-capacity storage facilities are often assembled from multiple technologies and storage devices, whereby the system organizational meta-information around a storage device can be very complex. Information about collaborative configuration in RAID sets, partitioning, formats and hosted content needs to be carefully maintained in association with a storage device, because once the storage subsystem components are separated from the system, the configuration and organizational metadata may not be inherently or automatically available. If not adequately documented, it can be quite difficult or impossible for an administrator to discover configuration details needed to bring the data online again.

What is needed is an improved scalable and flexible way to maintain information about mechanical storage devices, including information about their associated content. The information should be able to be accessed even when the device is offline or in a low power configuration.

SUMMARY OF THE INVENTION

Briefly, the present invention is directed towards a system and method by which information (e.g., content labeling in the form of a catalog or the like) is maintained with a storage device, and is accessible even when the storage device is offline or in a low power configuration. To this end, a storage module (e.g., in the form of a cartridge) contains one or more storage devices/storage media, such as a hard disk drive, and includes a display screen that outputs cached information corresponding to the storage device or devices. For example, the display may present a catalog of a storage device's content. A set of one or more buttons also may be provided, to allow a user to navigate among the information, such as via scrolling, whereby the display need only present a subset of the content catalog at any one time.

To maintain the information, the storage module contains non-volatile memory (e.g., NAND NVRAM), so that, for example, a hard disk drive need not be connected, or if connected, need not be spun up and operational in order to access the catalog or Non-volatile memory cached information. The storage module also provides a separate power source such as an internal battery so that the cached information may be accessed when the storage module is not fully operational, that is, when the storage module is not connected to a host computer or the storage device is in a powered-down state.

A catalog controller component comprising a processor and executable code provides the logic to generate the initial display output and to adjust the output appropriately as the user navigates via the buttons. Further, when the storage module is connected to a host computer system, the catalog controller operates to update the content labeling and/or other information stored in the storage module's NVRAM, as well as perform other operations such as providing information back to the host system. With this architecture, the storage module's NVRAM may store a representation or description of the content on the storage medium, whereby the labeling for the storage module is built into and displayed on the storage module itself, may contain significantly more information than a handwritten label, and may be dynamically updated. Other useful information such as complex configuration data and logging data may be stored.

When connected to the host system, some or all of the content labeling information of the storage module may be automatically and dynamically updated to persist the labeling catalog on the storage module. A host operating system-based application platform including a catalog provider component allows application programs and operating system components to register for tracking desired file-system related events, such as file creation, rename, delete and backup events, and to specify correlating actions such as to write corresponding content labeling information to the storage module's NVRAM as part of the catalog file upon detection of a corresponding event. When a registered event occurs, the event is automatically trapped by an inline intermediate storage event filter on the host system that delivers the corresponding event information (e.g., file name, size, owner and so forth) to the catalog provider of the host system, which in turn provides the information to the catalog controller of the storage module. With this approach the set of relevant events and corresponding actions may be different for different hard drives, and/or also for different users. Synchronization between the hard drive's actual contents and the information in the NVRAM cache may be performed, whether a full synchronization or a repair.

In one example implementation, the host system's catalog provider processes the event driven, program-provided labeling data into an appropriate content labeling information format, and then sends appropriate transaction records to the storage module's catalog controller. Various interconnect technologies are supported, via the host operating system's hardware driver support facilities input/output (I/O) and transaction subsystems. In one configuration the module's catalog controller shares a single interconnect between the host operating system components and the storage module. For example, a USB bridge that supports two separately addressable USB devices within the module, namely the catalog controller and a general USB-to-HDA storage controller, is used to separate the catalog information from the file system I/O data received over a single USB connection. Alternatively, a single SATA (serial ATA) cable couples the host system to the storage module, with a SATA Management Enclosure Bridge (SEMB) used to multiplex and separate file I/O from the catalog information which is tunneled through SEP_ATTN commands to the catalog controller. In another alternative configuration, the storage module has discrete and parallel communications paths, comprising one I/O communication path between the host system and the primary storage (e.g., over SATA), and another communication path from the catalog provider to the catalog controller (e.g., over a USB connection).

Via the storage module architecture, the offline storage of various other information may be supported, such as configuration information for the storage device (e.g., to track RAID set members), transaction log files, key storage, and event-based, scheduled and polled interaction schemes. Further, various other functionality also may be supported; for example, the storage module may be a distribution or installation vehicle for installing software and data to appliances and personal computers. In addition to the offline review of stored information and object metadata, the architecture allows for the caching of I/O data, the tracking and calculating of available space, and file parsing, e.g., of XML and text.

The storage module may also provide enhanced functionality while connected online that is not available offline. For example, when connected to an appliance, such as a headless appliance, the display may serve as a user interface arranged to deliver information on state, applications and services that are not necessarily hosted on the storage cartridge or even related to storage like auxiliary status and diagnostic displays.

Other advantages will become apparent from the following detailed description when taken in conjunction with the drawings, in which:

DETAILED DESCRIPTION

Exemplary Operating Environment

Figure 1:
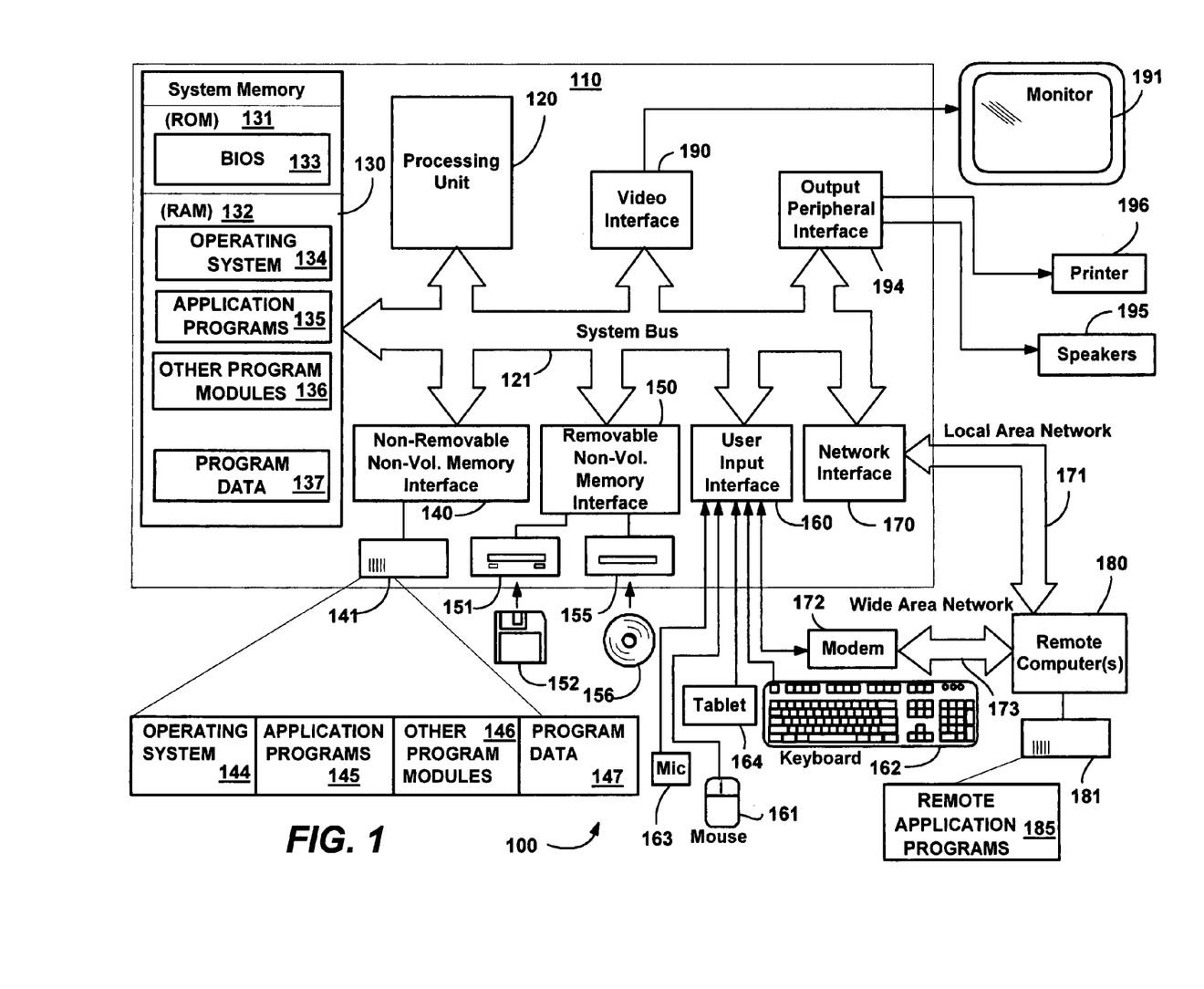
FIG. 1 is a block diagram generally representing a computer system which may host a storage mechanism in accordance with various aspects of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer-readable storage media and communication media. Computer-readable storage media includes volatile and nonvolatile, removable and non-removable media implemented in any method or technology for storage of information such as computer-readable instructions, data structures, program modules or other data. Computer-readable storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Incarnation Numbers for Resource State Cycling

The present invention is generally directed towards a system and method by which content labeling information (e.g., in the form of a catalog or the like) and possibly other information is maintained in association with a storage device, in a way that it is accessible even when the device is offline or in a low power configuration. As will be understood, numerous ways to implement the present invention are feasible, and only some of the alternatives are described herein. For example, the present invention is described below with reference to an example in which a storage module (or cartridge) is organized such that it hosts one or more persistent storage devices, such as mechanical hard drives, nonvolatile (NVRAM) or flash memory, tape cartridge, optical media or even floppy media. Notwithstanding, other types of storage mechanism containment arrangements are feasible. For example, as will be understood, the present invention may also be organized as a physical and/or logical containment mechanism associated with an analog device where digital description is desired. As such, the present invention is not limited to any particular examples used herein, but rather may be used various ways that provide benefits and advantages in computing in general.

Figure 2:
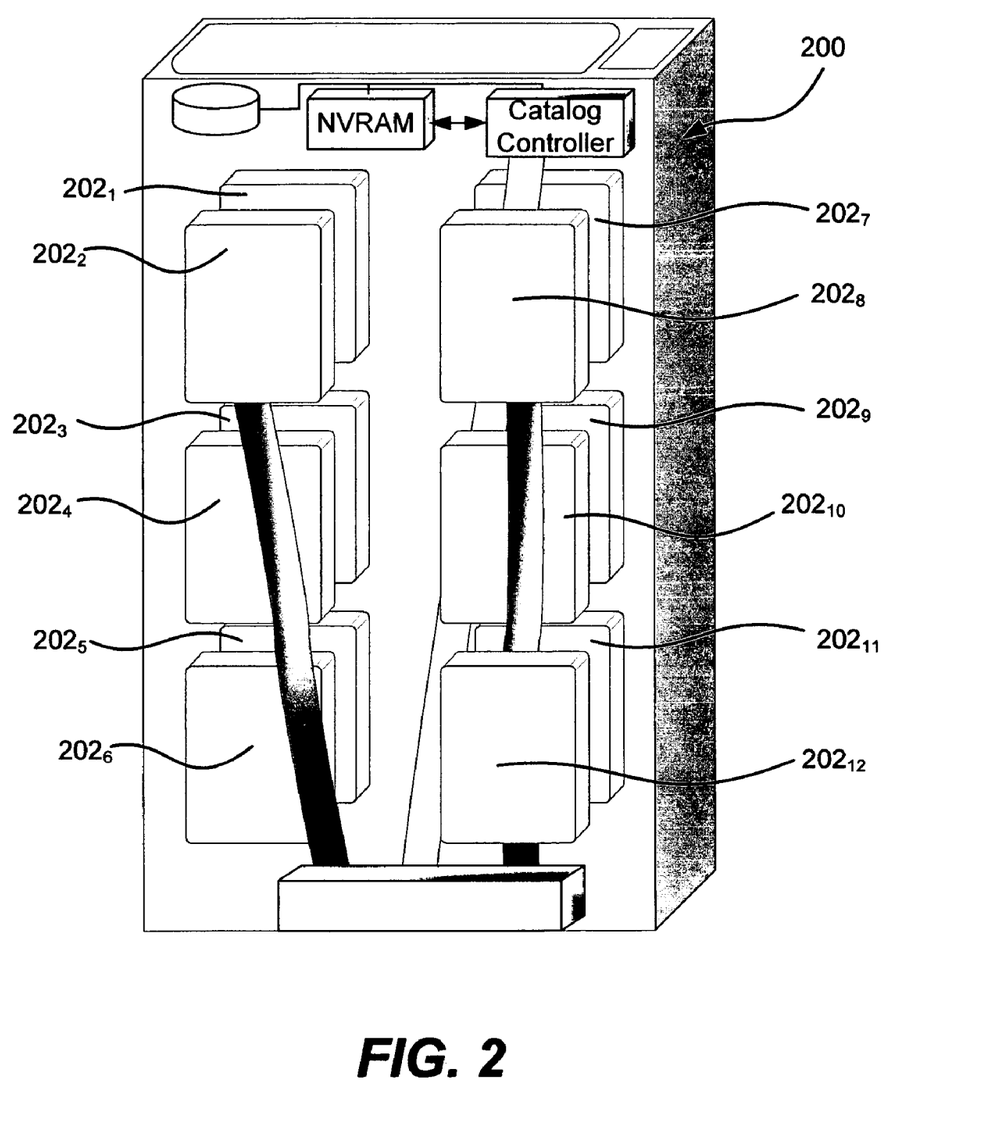
FIG. 2 is a representation of a storage module containing multiple storage devices and including components for providing offline storage information viewing in accordance with various aspects of the present invention.

As represented in FIG. 2, a managed container (e.g., cartridge) 200 may include one or more storage devices $202_1$-$202_{12}$, (although any practical number are feasible), wherein as used herein, the term "storage device" and its variations generally refer to the hardware mechanism (e.g., hard disk, optical drive, tape drive, disk drive and the like) and/or the storage media accessed by the hardware mechanism, (e.g., the platter, optical disk, tape, floppy disk, nonvolatile RAM and so forth). For example, as shown in FIG. 2 a number of hard disks may be contained within a single container 200 such as a set of independent disks, disks combined into a single volume, sets of mirrored disks, and/or disks arranged in one or more RAID sets. Note that the container may be separable from the storage device or devices, or contain the hardware mechanism but be separable from the storage media (such as an optical disk), in which event it is the storage device and/or storage media may be interchangeably connected to the container. Alternatively, the container and storage device may be of unitary construction, e.g., a hard disk drive, particularly (but not necessarily) a hot-pluggable one, may have its own permanent container. For purposes of simplicity herein, except where otherwise noted, the present invention will be primarily described with reference to a storage module that includes a container and a storage device comprising a single hard disk drive, regardless of whether the container is separable from the storage device, although it is understood that the present invention will work with optical drives and optical media, tape drives and tape media, and so forth. The storage module 300 may be interchangeably coupled (connected) to and decoupled (disconnected) from a host computer system, such as the computer system 110 of FIG. 1.

Figure 3:
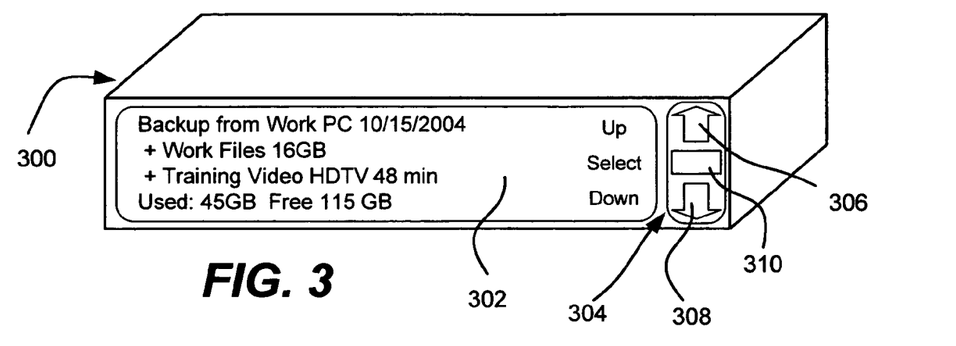
FIG. 3 is a representation of the front of a storage module having a display for providing offline storage information viewing and buttons for interaction, in accordance with various aspects of the present invention.

In accordance with various aspects of the present invention, as represented in FIG. 3, the storage module 300 includes a display screen 302 that outputs labeling information for at least some of the content contained in the storage device, and/or other information relevant to the storage device. As can be appreciated, another type of output mechanism, such as lights or a speaker for audio output, may be used instead of or in addition to the display screen. An input mechanism, such as a set of one or more buttons 304 also may be provided, to allow a user to navigate among the information, such as by scrolling. For example, as represented in FIG. 3, an up button 306 and a down button 308 are provided to enable scrolling, along with a select button 310 that allows a selection to be made, e.g., to expand or collapse a line of highlighted data, such as when scrolling through a hierarchically-organized directory tree. Note that not all of the displayed information needs to scroll; for example, labels such as main title and/or used and free space information may be continuously presented regardless of where the user scrolls, particularly if more lines of text are available. Graphics may also be displayed.

As can be readily appreciated, as in FIG. 3 the display 302 may be arranged to present a description of the buttons 304, in which event the meaning of the individual buttons and their accompanying description may be changed to match a current operating context. For example, if the information was organized as pages, the set of buttons 304 may represent page up (forward), page down (back) and home. A larger or fewer number of buttons may be present in a given storage module, e.g., a single button could be used to circularly scroll through the information, or left and right buttons may also be provided. Further, the buttons 304 may be used to access other information, such as by using them to navigate a menu, e.g., to find information such as the amount of free space on the storage module.

Figure 4:
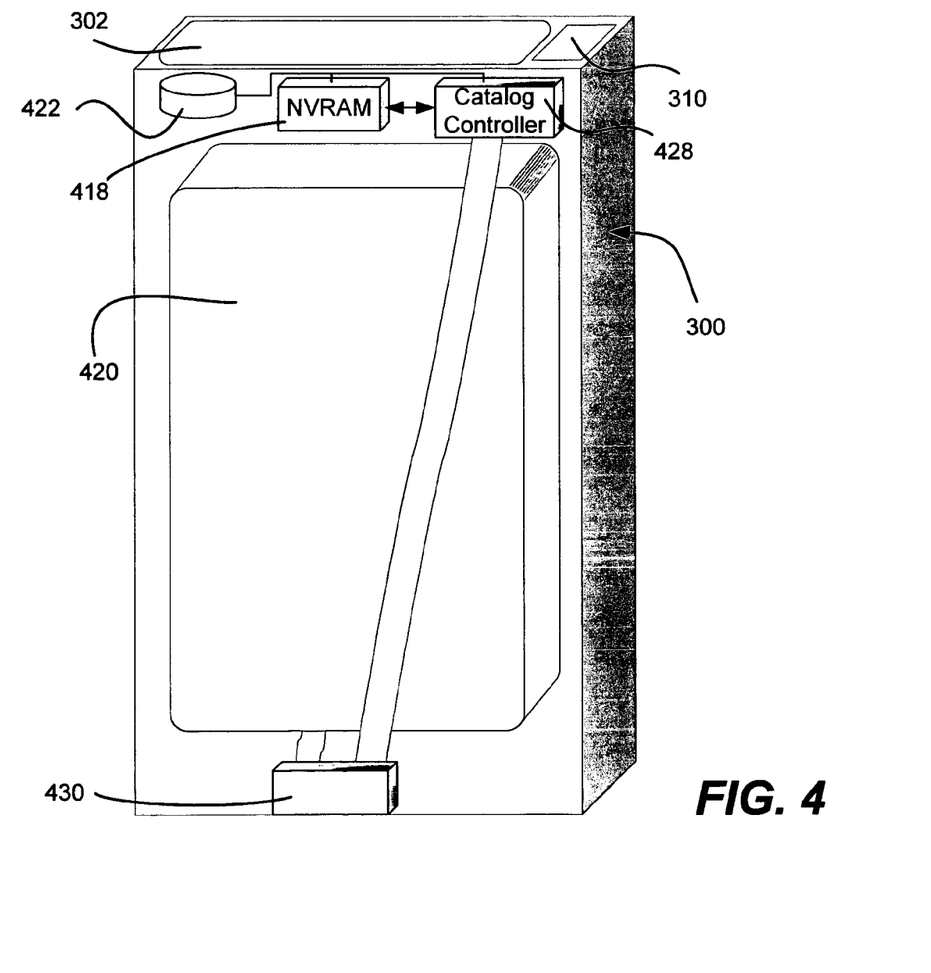
FIG. 4 is a representation of a storage module with the bottom removed to show an example module containing a single storage device and including components for providing offline storage information viewing in accordance with various aspects of the present invention.

In keeping with the present invention, as represented in FIG. 4 (in which the container's bottom is transparent to illustrate the internal components), the storage module 300 contains non-volatile memory 418 (e.g., NAND NVRAM) for storing a cache of the content labeling information. The content labeling information is typically separate from the primary storage medium (e.g. hard drive) 420, so that, for example, the hard disk drive need not be connected or spun up in order to access the content labeling information. In other words, the information is maintained in a memory that is accessible even when the primary storage device is non-operational. As a result, the content can be discovered while connected but without spinning up the disk; the storage module's display 302 and/or the host computer's display (e.g., the monitor 191 of FIG. 1) may be used to present the information in such a connected but primary storage device powered-down state.

So that the content labeling information and other information may be accessed from the NVRAM 418 when the storage module 300 is not connected to a host computer system, the storage module 300 provides an separate power source 422 (e.g., an internal battery). To conserve power, the display 302 can be turned off when not in use for a time; one or more of buttons of the button set 304 may be used as a "power-on" button to activate the display screen 302 and power the other components of the storage module 300. Note that contemporary USB hard drives already separately plug into a power source from the computer system's power, and this power source may be used instead of or in addition to a battery. Further, note that physical separation of the NVRAM memory 418 from the primary storage device is not necessary with a nonvolatile-memory-based storage device such as a USB flash "drive," as such a device may have some portion of its non-volatile memory reserved for preserving the content labeling information. The non-volatile memory may be part of the USB controller circuitry or part of the electronic controller circuitry of the hard drive.

To generate the initial output on the display and adjust it appropriately as the user navigates via the buttons 304, logic in the form of a catalog controller component 428 executes code. The catalog controller component 428 is shown as a separate component, such as a processor with a ROM, or RAM into which the code is copied/decompressed from the NVRAM 418 for execution, although as can be readily appreciated, the instructions of the catalog controller component 428 may execute in place in a section of the NVRAM 418. An operating system such as Microsoft Windows® CE is one possible platform for the catalog controller 428, however to save memory and cost, an alternative is to provide a simpler, low-power catalog controller primarily dedicated to display and navigation, and receiving data from the host computer system when connected. As described below, when connected, such a catalog controller 428 will still provide rich and broad functionality by using the host operating system (e.g., Microsoft Windows® XP), that is, the host operating system will perform much of the complexity needed to keep the content labeling information and any other information current.

The storage module also includes a pluggable interface 430 for interconnection with the host computer system. In addition to being coupled via the pluggable interface 430 to a host system for use as a conventional storage device, the catalog controller 428 also connects to the host system pluggable interface 430, generally for updating the content labeling information, as described below, but also for possibly other purposes such as providing information to the host system, upgrading the catalog controller logic, and so forth. Note that as described below with reference to FIG. 8, the pluggable interface 430 physically may be two separate interfaces, e.g., a USB interface and a SATA interface.

With this architecture, the NVRAM 418 can store a representation of the content on the storage medium 420 of the storage module 300, such as arranged as a catalog, whereby the displayed labeling of a storage module 300 is built into and travels with the storage module itself, may contain significantly more information than a handwrite label, and typically is dynamically updated. A substantial amount of information is viewable by utilizing the buttons 304 to display and navigate through the information describing hosted content. Other useful information such as configuration data and logging data may be stored. Note that if the storage module is such that its hard drive is separable from the cartridge container and the other module components, then the NVRAM may contain multiple catalogs, and use an appropriate one based on the drive that is currently inserted, e.g., by using a unique identifier for the drive. Alternative implementations may allow a user to view the information from more than one catalog even when the corresponding storage device is not inserted into the storage module.

Figure 5:
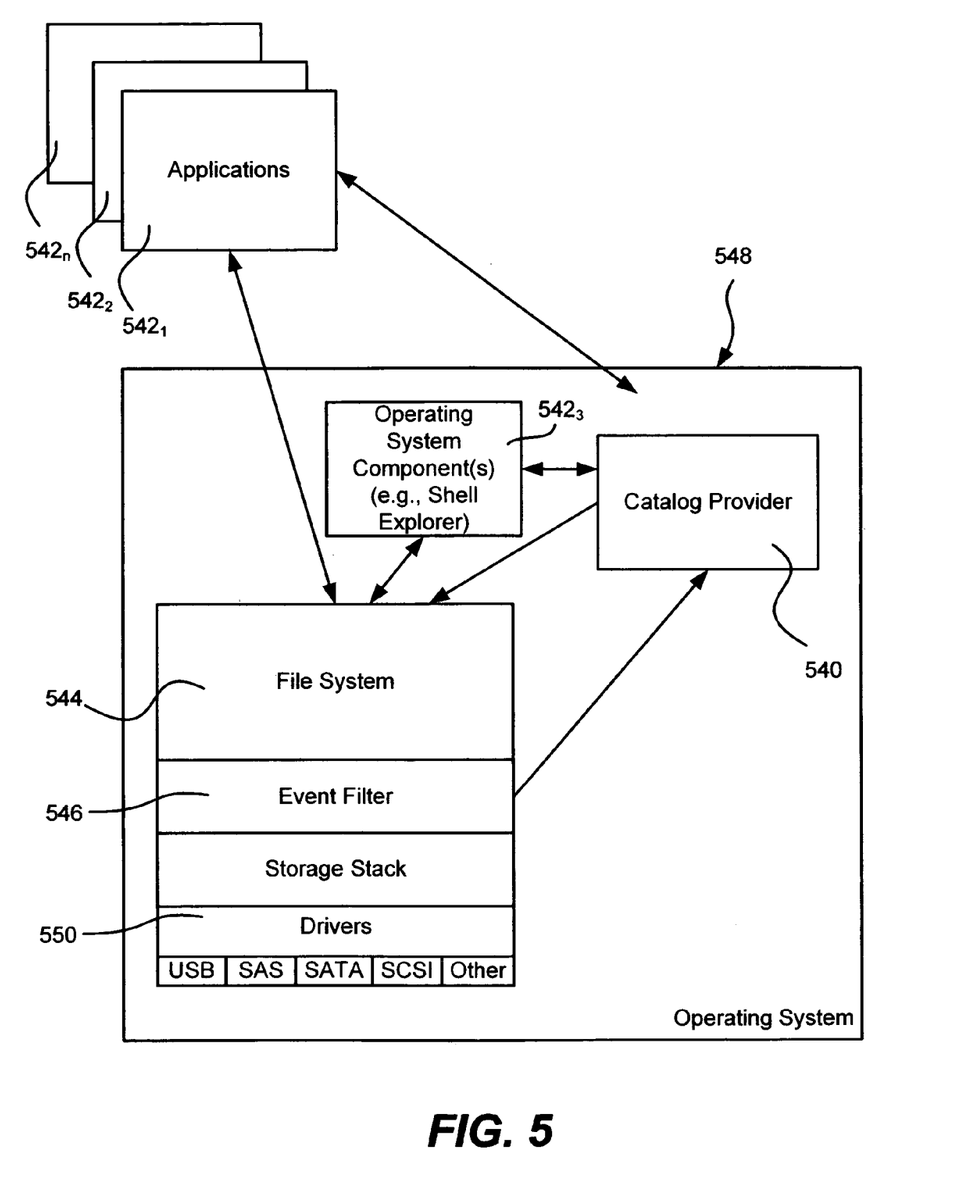
FIG. 5 is a block diagram generally representing components within a personal computer that provide a platform for automatically updating labeling information and/or other information on a connected storage module constructed in accordance with the present invention.

In accordance with another aspect of the present invention, as represented in FIG. 5, some or all of the content labeling information may be automatically constructed and persisted for the user when online, essentially dynamically updating the labeling. Another aspect is the ability for different implementations to organize the host operating system-based application platform, allowing possibly diverse application programs to effect varying functionality from a common hardware and software facility. Examples of such implementations including an implementation that may function more like a general purpose operating system, making broad and multifaceted information available. Another example implementation may provide specialized information exclusively about backup transactions, while yet another specialized implementation may provide Personal Video Recorder (PVR) services for rich media content and activities.

In one implementation, a catalog provider component 540 allows application programs and operating system components $542_1$-$542_n$ to register for desired events related to the file system 544, such as file creation, rename, delete and backup events, and to specify correlating content labeling information that is to be written to the NVRAM 418, e.g., as part of a catalog file or the like. When one of these events transpires, the event is automatically trapped by an inline intermediate storage event filter 546 that delivers event information (file name, size, owner and so forth) to the catalog provider 540. Rules for such events and corresponding actions may be cached in the operating system, (e.g., by the catalog provider 540), so that the programs that identified the events as relevant to cataloging actions need not be running in order for appropriate action to be taken when such an event transpires.

It can be readily appreciated that the set of relevant events and corresponding actions can be different for different storage devices, and/or also for different users. For example, when connected, a personal video recorder hard drive may be registered only for events related to audiovisual files, such as to transfer title and playing time data to the storage module NVRAM, whereas a backup hard drive may be registered for receiving another type of information in response to fired backup events. The hard drives may be distinguished by unique identifiers, or via a small file on the hard drive itself or in NVRAM, and indeed, a storage module may contain its own event settings so that even if plugged into a different computer system, the settings are available to the operating system. Based on login credentials, the operating system can also match a current user to a storage module (or a particular hard drive in a storage module if multiple and/or separable hard drives are in use) and trap the correct set of events for that user and/or storage device.

By allowing multiple programs to register for events, divergent capabilities can be effected and not all storage-related information needs to be cataloged for specific hardware, events or system configurations. Further, different events may be filtered for different storage modules. For example, only events related to audiovisual content (e.g., recognized by the files' extensions) may be cataloged on a particular storage module, while another storage module may catalog only one user's files. Note that virtually any file, system, and user properties may serve as filtering criteria for deciding whether an event should be reflected in the catalog. Further, external filtering criteria such as time-of-day, day-of-week, available NVRAM space and so on may be applied to effect the desired capabilities. The format may also change depending on the criteria and the type of event, e.g., save title and approximate playing time for a movie, but save filename, date, size and so on for a document.

Note that using the host operating system 548 allows a cartridge-based controller such as the catalog controller 428 to represent the desired content of the storage module 300 without having to interpret the block level formats or decoding low level wire communications I/O. A similar implementation, in which the controller natively interprets FAT or UFS directly is feasible, although is more difficult to implement with multiple concurrent file systems or more elaborate or proprietary file systems such as NTFS. The above-described event-filtering approach provides a way to develop a single controller that can support multiple file systems and protocols like CIFS or WebDAV and even abstract an encrypted file system.

To this end, the platform takes advantage of the host operating system's hardware driver support facilities 550, I/O and transaction subsystems. The modular driver facility 550 enables diversified controller interconnect technologies (USB, SATA, 1394, SAS, SCSI, iSCSI and so forth), without necessarily requiring development of new hardware support drivers. As the hard drive 420 is manipulated online by the host system, cached catalog data (e.g., records) are updated by the host software (the catalog provider 540) to represent the appropriate information about the storage module 300.

Via software application control, the design of FIG. 5 further allows a broad differentiation of functionality from a single hardware and software platform. For example, one implementation may provide very simple and terse representations of content, while another implementation exacts more elaborate and detailed catalog information. Note that the application programs represented in FIG. 5 may include any conventional application programs that create, delete and/or modify file data (particularly metadata), and the operating system components may include any programs (e.g., shell explorer) that create, delete and/or modify file data/metadata. Another such program that writes significant amounts of storage and information is a backup program; note that typical backup programs write the backed up data as one or more large files and maintain related information as to how the data is actually structured into folders and files. This related information may be sent in a suitable form to the NVRAM 418 so that a user can view the backed up data as if it was arranged in the directory/file hierarchy even though it is not actually stored as such. Still another application program (which may be in the catalog provider 540 or another operating system component) may be a utility or the like that allows the user to interactively review and modify the storage module's catalog.

For reliability purposes, a background and/or scheduled integrity checker program may be used to synchronize, repair and maintain coherency between the drive's actual resident information and that within the module NVRAM cache 418. The primary storage media may also be used to maintain replicas of the NVRAM data to extend system repair and recovery operations. Such synchronization not only makes the module more robust and resilient, but overcomes certain glitches and problems that may surface from portability between heterogeneous and different versioned systems. For example, it is possible that the storage module will be connected to a host that is not configured with the catalog provider, and thus a host computer system can modify files without cataloging the changes; upon reconnecting, synchronization (whether full or a repair) is desirable.

Another time synchronization is needed when a user decides to add a new type of event, for example to catalog audio files on a drive that formerly only cataloged video files. The synchronization program can discover the audio files and generate appropriate records so that both types of files are now cataloged. Further, if the storage module is such that its hard drive is separable from the cartridge container and the other module components, the synchronization program may be needed to update the NVRAM when a new hard drive is inserted into the module; note that in the above-described event-based model, such synchronization can only occur in the online state; in the offline state, the controller can recognize via a hard drive identifier or the like when it does not have catalog information in the NVRAM that corresponds to the currently inserted drive and notify the user that no valid catalog data is available for the currently-inserted storage device. The synchronization program may be incorporated into the catalog provider 540, but may alternatively reside in an application program or another operating system component.

Figure 6:
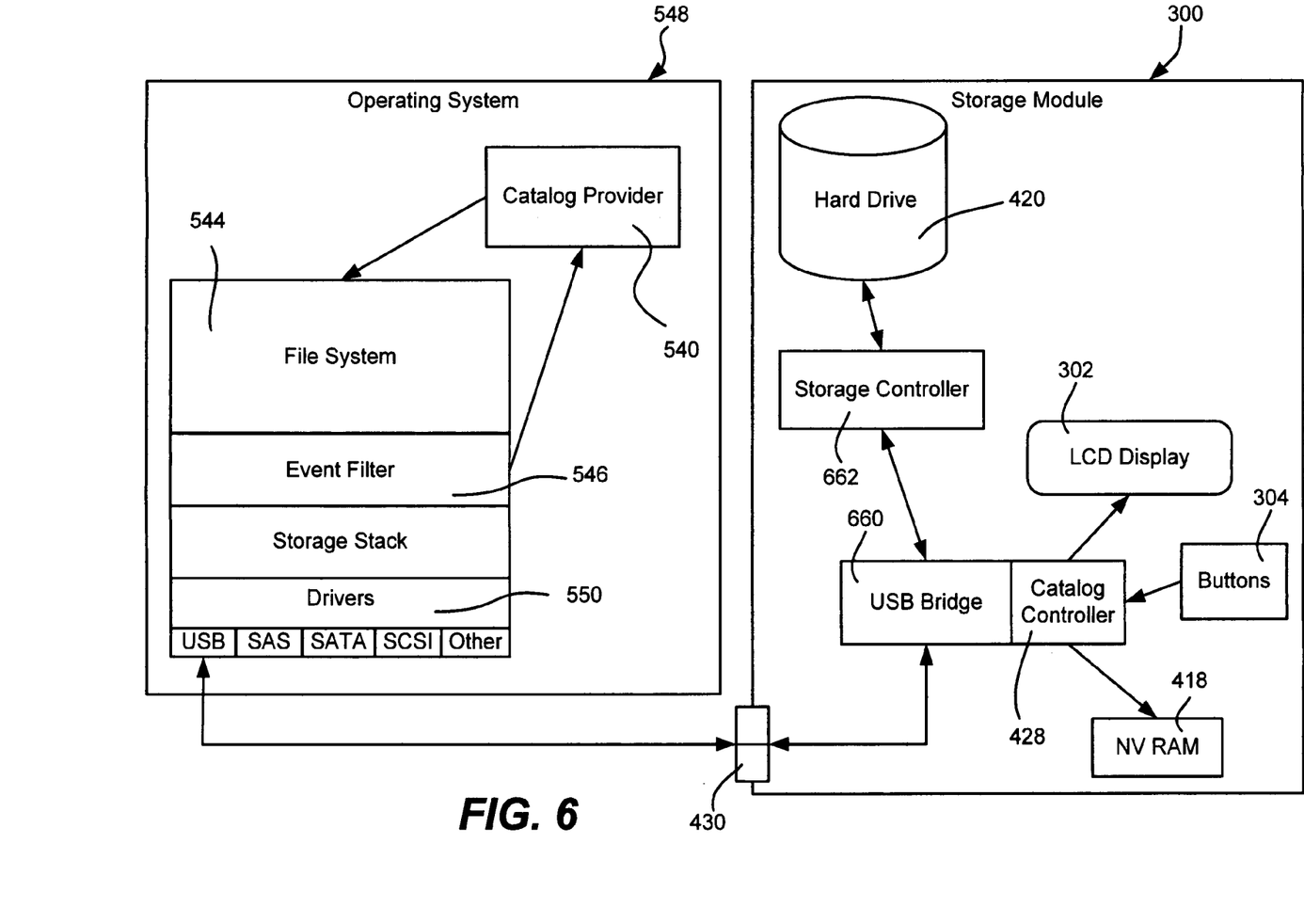
FIG. 6 is a block diagram generally representing components within a personal computer and a storage module constructed in accordance with the present invention, connected over a single USB connection to communicate input/output (I/O) data with the storage module's hard drive and to automatically update labeling information and/or other information on the storage module.
Figure 7:
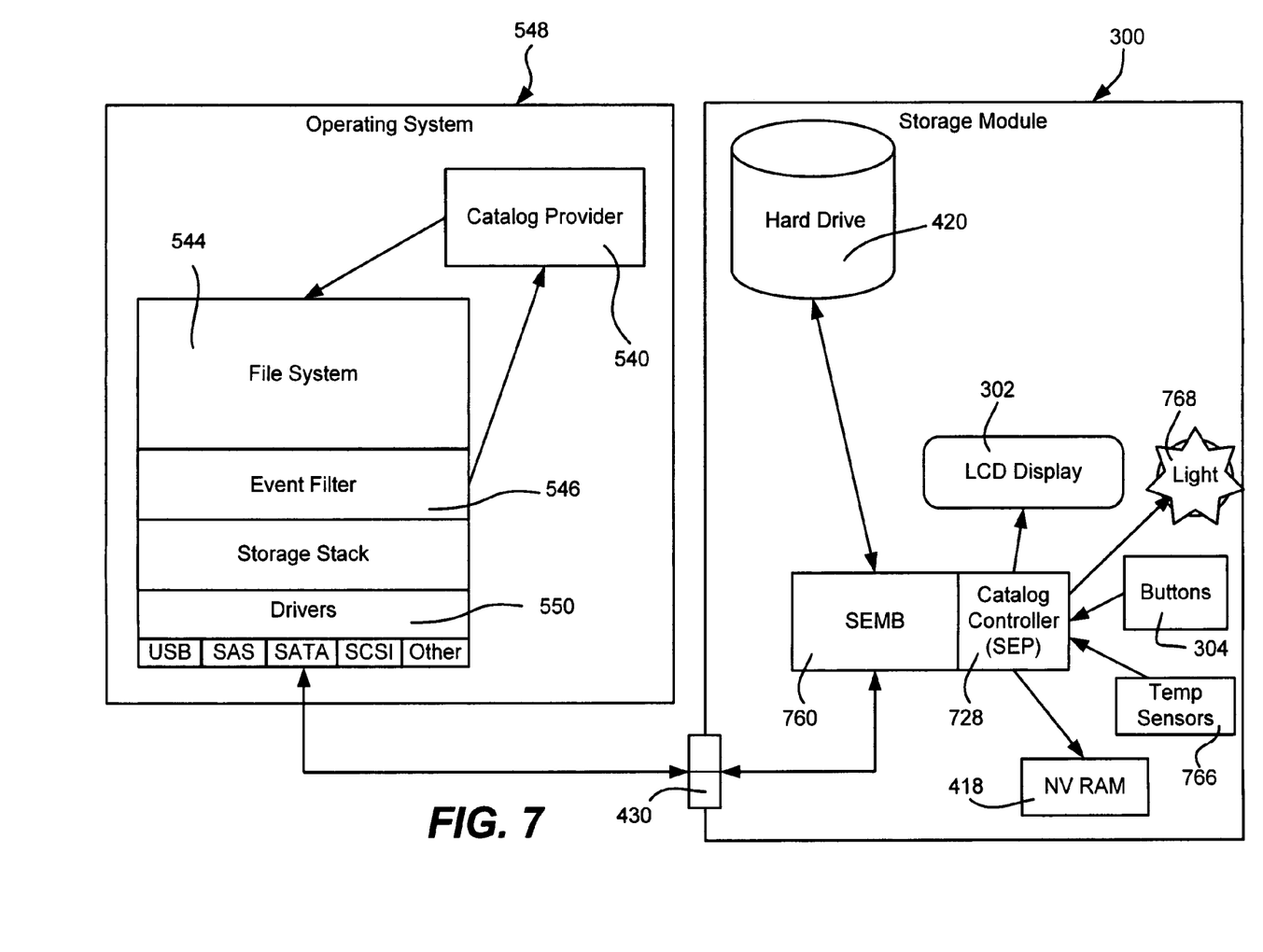
FIG. 7 is a block diagram generally representing components within a personal computer and a storage module constructed in accordance with the present invention, connected over a single serial ATA (SATA) connection to communicate I/O data with the storage module's hard drive and to automatically update labeling information and/or other information on the storage module.
Figure 8:
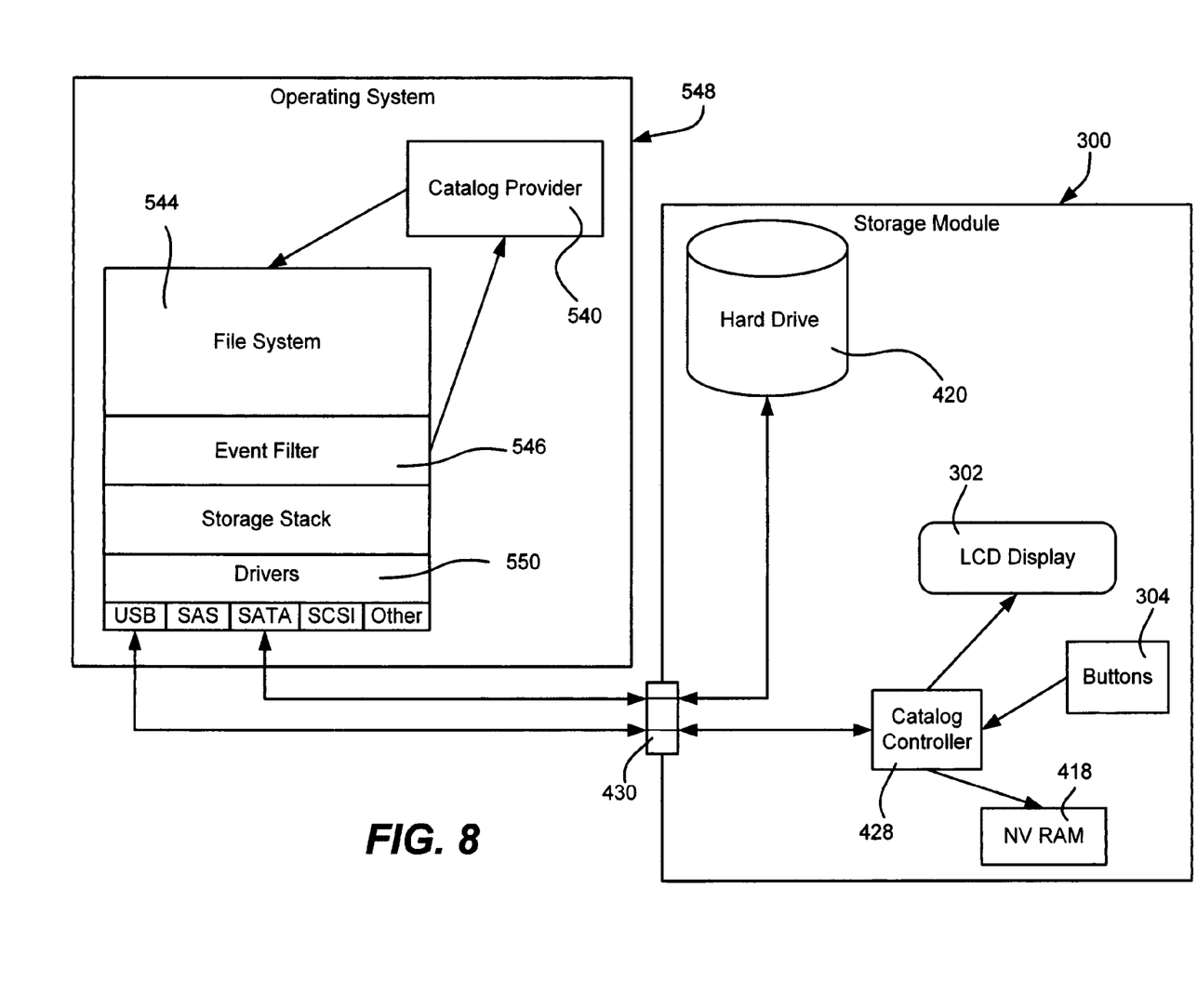
FIG. 8 is a block diagram generally representing components within a personal computer and a storage module constructed in accordance with the present invention, connected over a serial ATA (SATA) connection to communicate I/O data with the storage module's hard drive and connected in parallel over a USB connection to automatically update labeling information and/or other information on the storage module.

As represented in the alternative implementations of FIGS. 6-8, the catalog provider 540 processes the program-provided data into the appropriate content labeling information format, and then sends data such as appropriate transaction records to the storage module's catalog controller (e.g., 428 of FIG. 4). The records may be sent as soon as ready, or may be batched with other records. When received at the storage module 300, the records are processed so that content labeling information is added to, removed from or modified in the non-volatile memory 418. In general, the content labeling information thus comprises a catalog file arranged with content labeling information corresponding to the configuring applications' directives.

In the example configuration generally represented in FIG. 6, the module catalog controller 428 connects to the host through the primary storage interface, sharing a single interconnect between the host operating system components and the storage module 300. In the example of FIG. 6, the storage module 300 includes a USB bridge 660 that supports two separately addressable USB devices, namely the catalog controller 428, and a general USB-to-HDA storage controller 662. In this manner, file system I/O is communicated to and from the storage controller 662 and the cataloging (or other) information is communicated to and from the catalog controller 428.

Such an inline approach may be accomplished over a variety of alternative interconnects. In one example configuration generally represented in FIG. 7, a single SATA cable couples the host system that runs the operating system 548 and the storage module 300. Within the storage module 300 the cartridge or even the catalog controller 728 the module implements a SATA Management Enclosure Bridge (SEMB) 760 and utilizes storage enclosure processor (SEP) standards. The catalog provider 540 communicates with the catalog controller 728, tunneling information through SEP_ATTN commands over the shared SATA interconnect. This kind of catalog controller 728 management augments conventional storage enclosure processor functions such as temperature monitors/sensors 766, alarms, technician lights 768 and latch controls.

In another alternative example configuration, the overall system interacts as shown in FIG. 8, with the catalog controller 428 using discrete and parallel communications paths relative to the primary storage 420. In this example, FIG. 8 shows the catalog provider 540 communicating with the catalog controller 428 over a USB connection, while general file I/O to and from the hard drive 420 uses the native SATA or IDE facilities. The catalog functionality thus may utilize the host USB facilities and not necessarily require special inline multiplexing hardware support facilities.

When connected in the online state, the storage module's display 302 may support other information and functionality for the host system. For example, the storage module 300 may be a distribution or installation vehicle for installing software and data to appliances and personal computers. The display 302 may provide user interface services to system and applications for an otherwise headless appliance. The architecture establishes an interface facility for BMC (baseboard management controller), EMS (extended messaging service) and USB/Nuart scenarios.

The storage module 300 may also enable functionality while connected online that is not available offline. For example, when connected to an appliance, the display may provide a user interface arranged to deliver information on state, applications and services that are not hosted on the storage cartridge or even related to storage. As a further example, the display of the storage module may serve as an auxiliary display that is at least partially under the control of the host computer system, as described in U.S. patent application Ser. Nos. 10/429,930, 10/429,932, 10/837,895, 10/837,894, 10/838,174 and 10/837,900, assigned to the assignee of the present invention and hereby incorporated by reference.

Because of the application program/operating system platform, the present invention is able to take advantage of many of the rich technologies provided in the operating system (e.g., Windows®) code base, such as to make it easier to leverage services Windows® identity and cryptography infrastructure to ensure that the data on the storage module 300 is inaccessible to unauthorized users. The catalog controller 428 may maintain and control an encrypted and permissioned content store with secretly maintained keys and encrypted NVRAM control files, and also may enforce security. For example, the catalog controller 428 may require an identifier/password be entered to view the catalog, and even distinguish between multiple users, so that a user sees a display of only the user's catalog data, and does not see data from another user's catalog. Certain users may be able to view labeling information for one class of data or transactions (e.g., configuration information) but not another (e.g., backup information). The catalog controller 428 may also function as a trusted agent and/or surrogate facility with respect to the host operating system 548, enforcing secure and secret storage for certificates, licenses and other privileged data cached in the NVRAM 418.

Moreover, the NVRAM 418 may host configuration data for the storage module 300 in addition to the catalog. This may help a host computer system reintegrate a storage device via details of how the devices functioned collaboratively and collectively in a RAID set. The storage module 300 may optionally cache multiple catalogs and configuration sets, allowing for flexible interchange of storage devices within a storage module.

When the storage module 300 is removed from the host system, the drive's primary interconnect (e.g., SATA) becomes non-functional. However, in keeping with the present invention and as described above, because of the independent power source 422 and the included catalog controller 428, the user is able to utilize the display panel 302 and control buttons 304 in such an offline state, typically to navigate via catalog controller 428 the content of the cached catalog in the NVRAM 418. In addition, the catalog controller 428 may provide access to other types of data, such as transaction logs, scheduling data, and/or may provide a parsing and rendering facility, such as for interpreting XML. XML may be used to capture configuration and policy information for module functionality. XML may be used to describe the structure of the user interface and associate user events like a button press with the associated file system operations like delete. Further, through structured XML, configuration and catalog files may support broad extensibility capabilities, and, in addition to supporting the above-described dynamic catalog described, the controller may also allow dynamic vender provided and/or user constructed interface metadata. A catalog controller may also process HTML and text files, allowing a user to cache and make some data available offline beyond the catalogs and any help files. An application may direct the catalog provider to cache replicas of specific data according to delegated policy. Event based, scheduled and polled interaction schemes may be provided.

It should be noted that the architecture of the present invention that has the NVRAM 418 associated with the storage module 300 also allows for caching some of the file data on the hard drive 420. For example, if all of the NVRAM 418 is not consumed by the catalog or catalogs and other information, the remainder of the NVRAM 418 can serve as a fast I/O cache. In such a system, the catalog controller 428 further includes logic that allows it to act as a cache manager/memory manager. As can be readily appreciated, such an arrangement will help improve speed and conserve power because the disk need not be spun up to perform some of the I/O operations, which is particularly valuable on a mobile computing device. Further, the present invention is extensible for other services, such as the above-described secure software and configuration distribution, and ID/profile/configuration synchronization of non-networked computers, such as UDF configuration of wireless, firewall and consumer electronic devices.

As can be seen from the foregoing detailed description, there is provided a method and system that provide electronic labeling and other information for mechanical storage devices and their associated content in a scalable and flexible manner. The storage-related information is able to be accessed even when the device is offline or in a low power configuration, thereby providing numerous benefits in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method of identifying content stored on a storage device, wherein the storage device is configured to be selectively decoupled from a storage module and the storage module is configured to be selectively decoupled from a host computing system, the method comprising:

registering to detect future file-system events at the host computing system, wherein the registering to detect future file-system events includes registering to detect future file-system events that involve a specific type of storage device, and wherein registering further includes at least one filtering criteria corresponding to a file property for the specified type of storage device;

maintaining information related to the content of the storage device in a memory on the storage module, wherein the storage module couples to the storage device and the host computing system, the storage module further being selectively decouplable from the storage device and the host computing system;

after registration to detect future file-system events, detecting a registered event occurring and which corresponds to one or more of the future file-system events including the at least one filtering criteria;

upon the detection of the registered event matching the at least one filtering criteria, updating the information related to the content of the storage device stored in the memory on the storage module; and after updating the information, outputting data corresponding to the information related to the content of the storage device on a display on the storage module, including when the content of the storage device is unavailable, wherein said unavailability is defined by at least one of the following: (a) when the storage device is offline, or (b) when the storage device is in a low power state, and wherein outputting data corresponding to the information comprises:

continuously displaying a main title of the storage device;

continuously displaying used or free space of the storage device; and scrollingly display additional information that is selectable by a user of the storage device, while continuing to display the main title and of used or free space of the storage device.

2. The method of claim 1 wherein outputting data corresponding to the information on the display comprises providing catalog data corresponding to the content stored on the storage device.

3. The method of claim 1 wherein the information maintained in the memory comprises content catalog information, and wherein the outputting data corresponding to the information on the display comprises providing catalog data when the storage module is coupled to the host computer system but the storage device is in a non-operational state.

4. The method of claim 1 further comprising, receiving commands, and adjusting the data output on the display in response to the commands.

5. The method of claim 1 wherein the storage module is coupled to the host computer system, and further comprising, transferring at least some of the information from the host computer system to the storage module.

6. The method of claim 5 wherein transferring at least some of the information from the host computer system to the storage module comprises sending data in response to an event detected by the host computer system.

7. The method of claim 1 wherein the type of device corresponds to personal video recorder hard drive and at least one filtering criteria corresponds to events associated with audio-visual files.

8. The method of claim 7 wherein the type of device corresponds to a backup hard drive and at least one filtering criteria corresponds to events associated with backing up data.

9. The method of claim 1 further comprising, detecting replacement of the storage device with a second storage device, and further comprising, outputting different data on the display.

10. The method of claim 9 wherein the outputting different data on the display comprises accessing another set of information maintained in the memory, the other set of information corresponding to the second storage device.

11. The method of claim 1 wherein the outputting data comprises outputting storage space-related data on the display.

12. One or more computer-readable storage media that store computer-executable instructions which when executed perform the method of claim 1.

13. In a computing environment, a system for identifying the content stored on a storage device, wherein the storage device is configured to be selectively decoupled from a storage module and the storage module is configured to be selectively decoupled from a host computing system, the system comprising:

a storage device containing data accessible by a host computing system when the primary storage device is selectively coupled to the storage module and the storage module is selectively coupled to the host computing system, and wherein the host computing system selectively coupled to the storage module includes a detection mechanism comprising an event filter that detects events matching at least one filter criteria associated with a file property and an update mechanism that updates the storage module memory with information related to the detected event, wherein the at least one filter criteria is dependent upon the type of storage device and a user identity; and the storage module that selectively couples to the storage device and the host computing system, the storage module being selectively decouplable from both the storage device and the host computing system, the storage module including a power source, memory that contains information related to the data contained in the storage device, a user interface comprising a display screen on the storage module, and a controller coupled to the memory and to the user interface, the controller configured to access the memory and to output data corresponding to the information related to the data contained in the storage device to the display screen, including when the contents of the storage device are unavailable for access, wherein said unavailability is defined by at least one of the following: (a) when the storage device is offline or (b) when the storage device is in a low power state, wherein said user interface is configured to:

continuously display a main title of the storage device;

continuously display free or used space of the storage device; and scroll through additional information as directed by the user, wherein as the user scrolls through the additional information, the main title and free or used space of the storage device continues to be displayed.

14. The system of claim 13 wherein the user interface further comprises an input mechanism coupled to the controller, and wherein the controller receives commands from the input mechanism and adjusts the data output to the display screen in response to the commands.

15. The system of claim 13 wherein the storage module includes an internal battery and optional charging circuitry that powers the display screen and the controller when the storage module is decoupled from the host computer system.

16. The system of claim 13 wherein the storage module is hot-pluggable into the host computer system.

17. The system of claim 13 wherein the storage module couples to the host computer system via a single communications link that handles I/O communications to the storage device and the storage information communications to the controller, and wherein the storage module includes a bridge that separates the I/O communications from the storage information communications.

18. The system of claim 13 wherein the storage module couples to the host computer system via at least two distinct communications links, including at least one communications link that handles I/O communications to and from the storage device and another communications link that handles the storage information communications to the controller.

19. The system of claim 13 wherein when the storage device is decoupled from the storage module, and a second storage device is coupled to the storage module.

20. The system of claim 13 further comprising at least one other storage device that couples to the storage module.

21. The system of claim 13 wherein the storage module is coupled to the host computer system, and wherein the host computer system includes a detection mechanism that detects when a change to the storage information is needed in the storage module memory, and an update mechanism that updates the storage module memory.

22. The system of claim 21 wherein the storage information comprises a catalog of labeling information corresponding to the content of the storage device, and wherein the detection mechanism comprises an event filter that captures events including events related to changes to the content of the storage device.

23. The system of claim 22 wherein the update mechanism comprises a catalog provider coupled to the event filter, the catalog provider configured to communicate data to the controller of the storage module for updating the storage module memory in response to the event detected by the event filter.

24. The system of claim 13 wherein the storage information comprises configuration details corresponding to the storage device.

25. The system of claim 13 wherein the storage module is coupled to the host computer system, and wherein the host computer system communicates with the controller to output auxiliary information provided by the host computer system to the display.

26. The system of claim 13 wherein the storage module is coupled to the storage device and the host computing system and a remainder of the storage module memory not consumed by the information related to the data contained in the storage device is further dedicated to caching I/O between the host computing system and the storage device, thereby acting as a fast I/O disk cache between the host computing system and the storage device.

27. At least one computer-readable storage media that store computer-executable instructions, which when executed perform a method, comprising:

registering for detection of file-system events at a host computing system related to content of a storage device, wherein the registration includes at least one filtering criteria based on the type of storage device;

receiving storage-related information from the host computer system corresponding to the storage device coupled to a storage module coupled to the host computer system, wherein the receipt of the storage-related information from the host computer system triggers the at least one filtering criteria based on the type of storage device and the storage-related information has been filtered according to at least one filtering criteria associated with a file property, the storage module being selectively decouplable from both the primary storage device and the host computing system;

storing the filtered storage-related information received from the host computer system in a memory on the storage module, the memory being independent from the host computer system and the storage device and accessible independent of whether the storage device or the memory is coupled to the host computer system and independent of whether the storage device is offline or otherwise inaccessible and such that the storage-related information is accessible even when contents of the storage device are unavailable for access, wherein said unavailability is defined by at least one of the following: (a) when the storage device is offline or (b) when the storage device is in a low power state;

receiving a command; and accessing the memory to output data related to the filtered storage-related information received from the host computer system to a display screen on the storage module that is operational to display data independent of whether the storage device or the memory is coupled to the host computer system, wherein outputting data related to the filtered storage-related information includes outputting the data as additional information that is scrollable by a user, wherein at least a main title of the storage device and free or used space of the storage device are also displayed continuously, and independent of scrolling requests by the user.

28. The computer-readable storage media of claim 27 wherein receiving the command comprises receiving indication of a button actuation from among a set of at least one button that is operational independent of whether the storage device is coupled to the host computer system.

29. The computer-readable storage media of claim 27 wherein the command corresponds to a navigation command, and further comprising, changing currently displayed output data in response to receiving the command, to provide different data representative of scrolling through the storage-related information.

30. The computer-readable storage media of claim 27 wherein the storage-related information corresponds to a catalog of content that is maintained on the storage device, and wherein accessing the memory comprises accessing data for a piece of content maintained on the storage device.

31. The computer-readable storage media of claim 27 wherein the storage-related information corresponds to a key needed to decrypt at least some of the data maintained on the storage device, and further comprising reading the key from the memory.

32. The computer-readable storage media of claim 27 wherein the storage-related information corresponds to configuration information for the storage device, and wherein accessing the memory comprises reading the configuration information to display data corresponding to the configuration information on the display screen.

33. The computer-readable storage media of claim 27 wherein receiving the storage-related information from the host computer system comprises receiving a record corresponding to an event detected at the host computer system.

34. In a computing environment, a system for identifying content stored on a computer storage device, the system comprising:
- the storage device, wherein the storage device contains data related to information stored by a host computer system;
- a storage module that is selectively couplable to the storage device and the host computing system, the storage module further being selectively decouplable from the storage device and the host computing system;
- a memory on the storage module that contains data related to the information stored by the host computing system contained in the storage device, wherein the data contained in the memory related to the information stored by the host computing system is limited to data matching at least one filtering criteria associated with a file property registered at the host computing system, the registered filter criteria is dependent upon a type of storage device, and is accessible even when the storage device is unavailable for access, wherein said unavailability is defined by at least one of the following: (a) when the storage device is offline or (b) when the storage device is in a low power;
- a controller coupled to the memory, the controller maintaining key and encrypted control files;
- a connection selectively coupling the controller and the storage device to the host computer system;
- a user interface coupled to the controller, the user interface comprising an input mechanism and a display on the storage module, wherein the user interface is configured to cause the display to display continuous information that is present while the display is operating, and scrollable information that is selectively displayed based on scroll requests from a user, wherein the continuous information includes a main title of the storage device, free space information of the storage device, and used space information of the storage device; and
- a power source that powers the user interface and the controller to facilitate access to the memory and control of the user interface to display storage-related information of the storage device when the controller is not coupled to the host computer system.

35. The system of claim 34 wherein the memory, controller, user interface and the user interface are incorporated into a cartridge that couples with the storage device.

36. The system of claim 35 wherein the power source is incorporated into the cartridge.

37. The system of claim 35 wherein the storage device comprises a media reader having one or more removable media loaded therein.

38. The system of claim 34 wherein the storage-related information labels content stored on the storage device, and wherein the controller controls of the user interface to display labeling data representative of at least some of the content stored on the storage device.

39. The system of claim 38 wherein the input mechanism provides commands to the controller, and wherein the controller changes the labeling data that is displayed in response to the commands.

* * * * *